Figure 5:
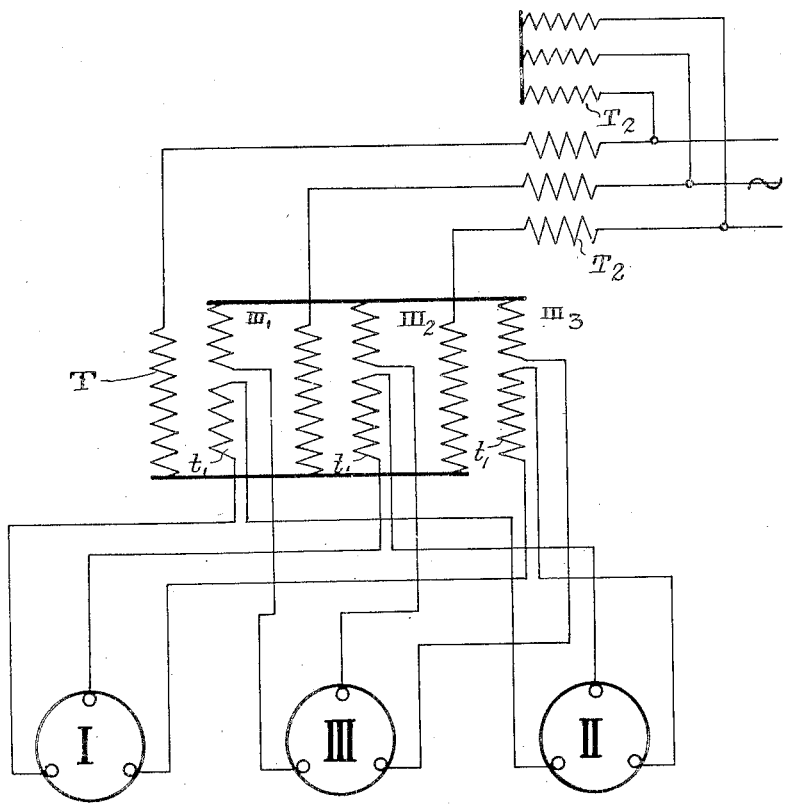

Feb. 26, 1929.　　　　　　　　　　　　　　　　　　1,703,242
S. A. KUKEL
PRODUCTION OF SINGLE AND MULTIPHASE ALTERNATING CURRENTS
Filed June 2, 1924　　　　7 Sheets-Sheet 1
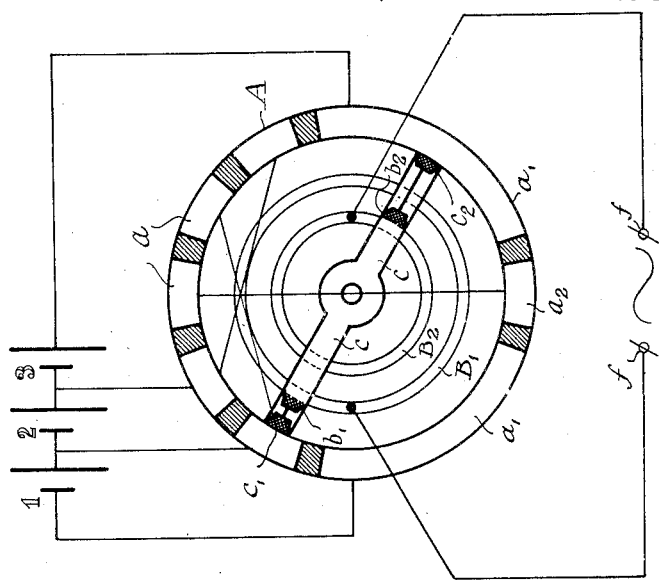
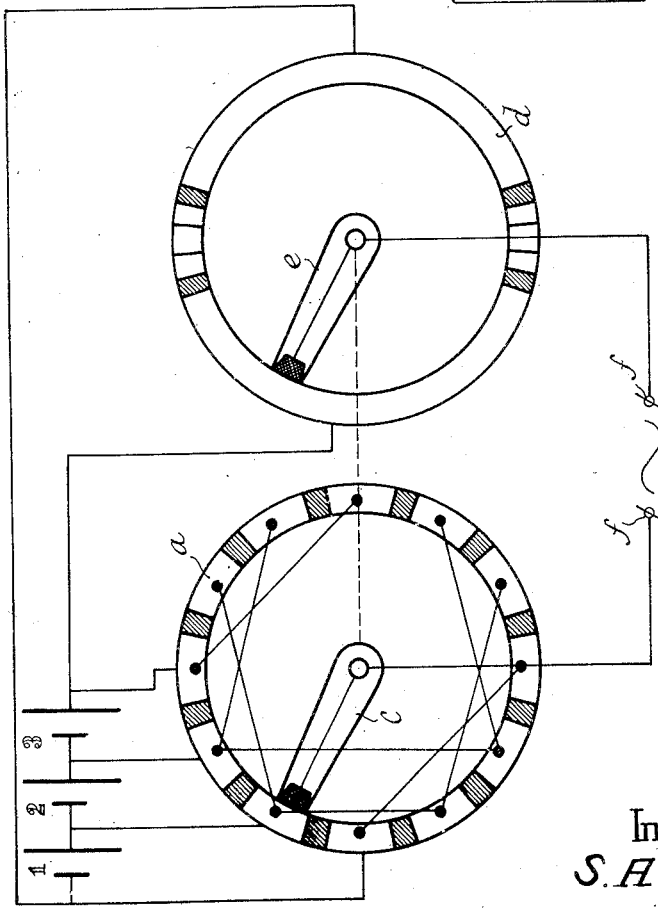
Inventor:
S. A. Kukel
By Marks & Clerk
Attys.

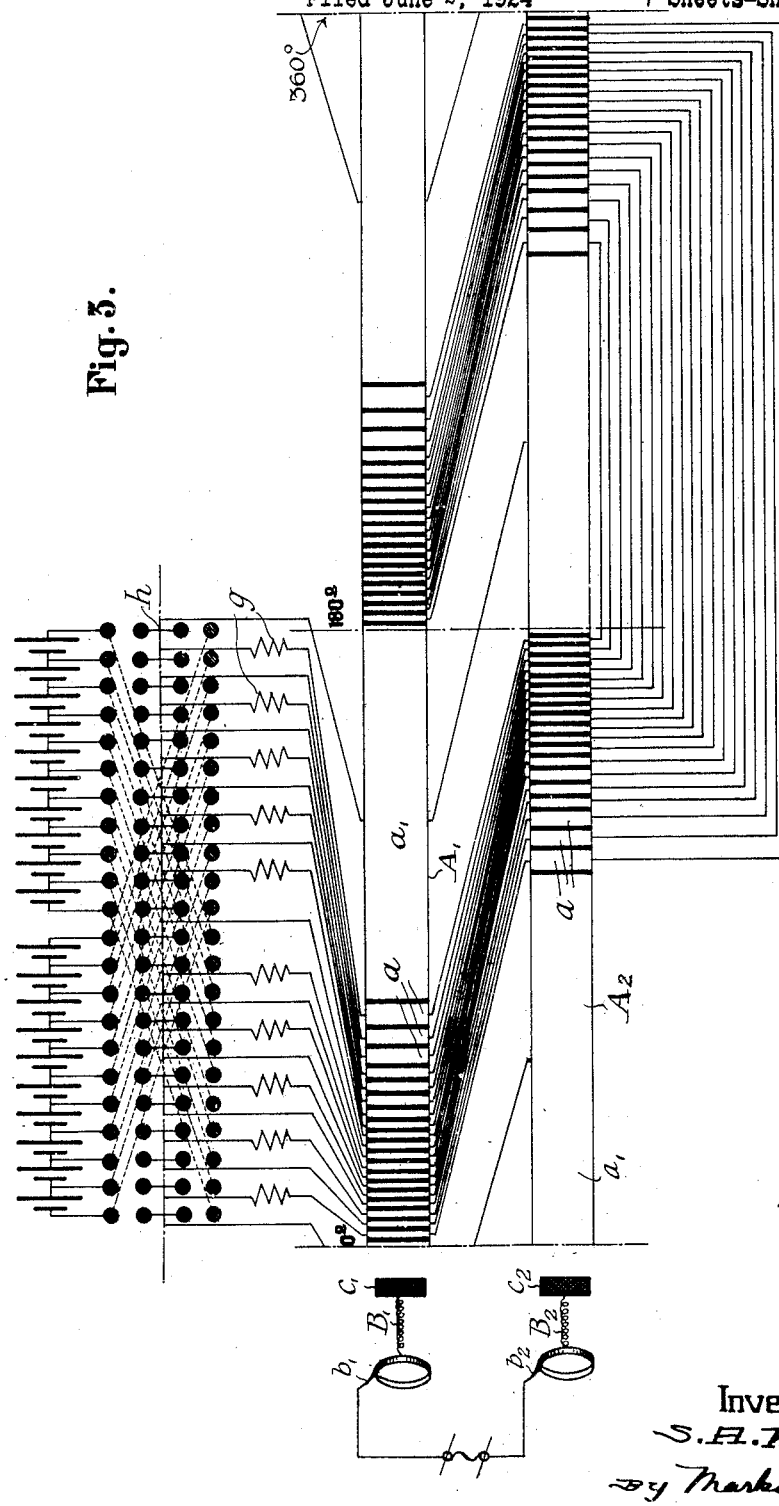

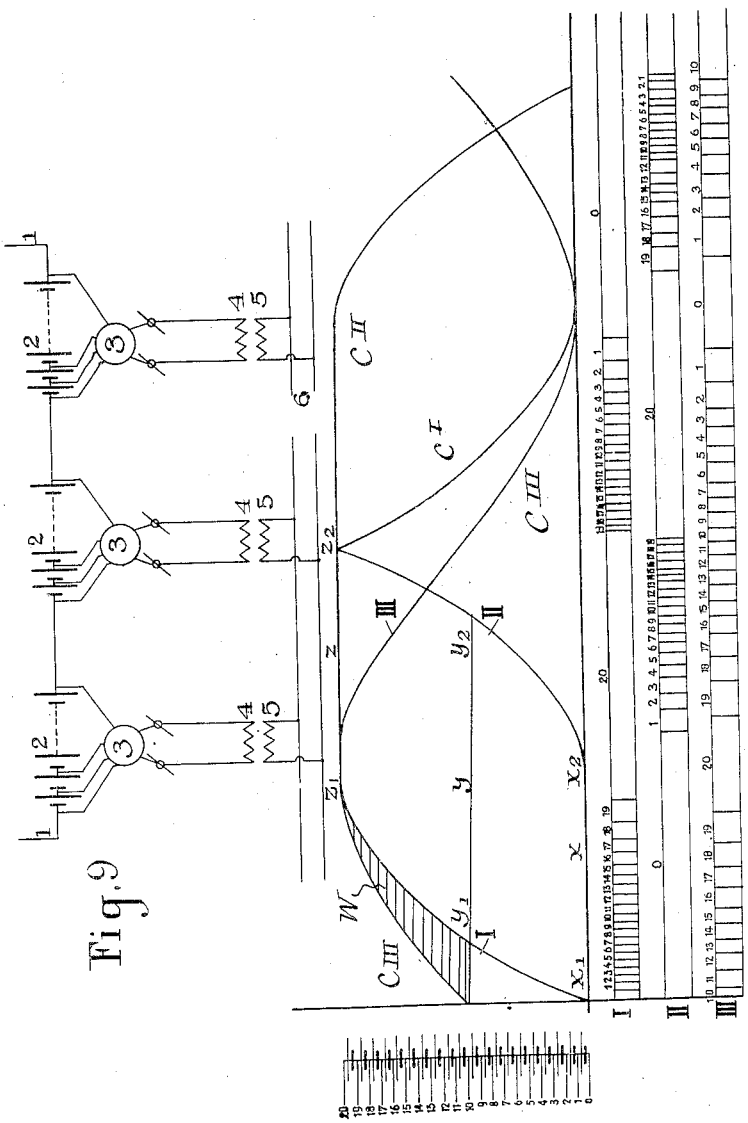

Feb. 26, 1929.

S. A. KUKEL 1,703,242

PRODUCTION OF SINGLE AND MULTIPHASE ALTERNATING CURRENTS

Filed June 2, 1924    7 Sheets-Sheet 4

Inventor:
S. A. Kukel
by Marks & Clerk
Attys.

Feb. 26, 1929.

S. A. KUKEL 1,703,242

PRODUCTION OF SINGLE AND MULTIPHASE ALTERNATING CURRENTS

Filed June 2, 1924   7 Sheets-Sheet 5

Inventor:
S. A. Kukel
By Marks & Clerk
Attys.

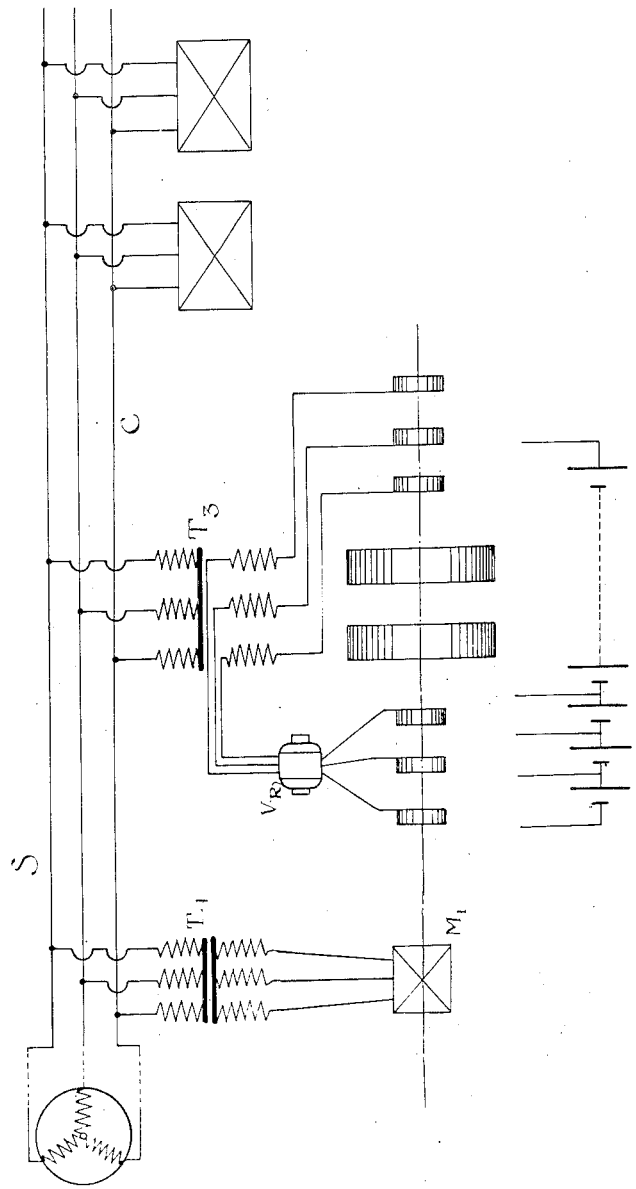

Feb. 26, 1929.  
S. A. KUKEL  
1,703,242

PRODUCTION OF SINGLE AND MULTIPHASE ALTERNATING CURRENTS

Filed June 2, 1924    7 Sheets-Sheet 7

Inventor:
S. A. Kukel
By Marks & Clark
Attys.

Patented Feb. 26, 1929.

1,703,242

UNITED STATES PATENT OFFICE.

SERGEI ANDREJEWITSCH KUKEL, OF MOSCOW, RUSSIA.

PRODUCTION OF SINGLE AND MULTIPHASE ALTERNATING CURRENTS.

Application filed June 2, 1924, Serial No. 717,426, and in Germany August 28, 1923.

This invention relates to a method of and apparatus for converting the direct current voltage of a battery of accumulators into a periodically varying voltage or for converting a single or multi-phase alternating current voltage into a continuous current voltage or for changing the number of phases or the frequency of an alternating current, other applications of the invention being hereinafter more particularly referred to.

Electric accumulators have hitherto been used, as a transportable source of electric energy, as a reserve should the central station fail to generate current, as load regulators at the central station, whereby the uneconomical form of load curve is corrected, and as boosters in those cases where the loads vary quickly, but hitherto all these applications could be made full use of only in continuous current installations.

The use of accumulators in connection with alternating current supplies would show the same advantages as those referred to in connection with continuous current; however, the battery has to be connected with a mechanism which allows the production of an alternating voltage.

Such an arrangement would probably open new fields of application for the accumulators, more especially in alternating current installations.

This problem was raised long ago and attempts have been made to solve it by using the ordinary commutator of a continuous current dynamo. However, the difficulties that arose from a practical point of view, were so great that the invention did not lead to any application.

The methods hitherto proposed had the following defects:—(1) there was a great lack of uniformity in the extent to which the individual groups of accumulators were utilized, (2) they were of no use in those cases in which the circuit contained an inductive or capacitive load, and (3) great difficulties were encountered when the alternating voltage curve was not entirely symmetrical.

The mechanism hereinafter described and referred to as a "battery switch converter" solves the problem of producing an alternating E. M. F. by means of a battery of accumulators and is free from the drawbacks above referred to. Moreover, by means of the new apparatus it is possible to convert an electric current of one kind into an electric current of another kind (for instance by changing the phases or the frequencies) through the intermediary of electrochemical energy, instead of the electro-magnetic energy that comes into play in the usual rotary converters and motor generators. This kind of current conversion opens a new field for the use of accumulators, at the same time extending their life and allowing them to stand a higher overload, the efficiency being also highly increased, owing to the reduction to a minimum of the cell capacity, a large capacity being unnecessary in this case. Moreover, the present invention allows the following three electro-technical problems of today to be solved by means of accumulators: (1) Making the power factor as nearly as possible equal to unity, (2) increasing the possibility and the limits of speed regulation of induction motors, and (3) removing certain great disadvantages of systems of power transmission by means of high tension continuous currents or of high tension alternating currents of very small periodicity.

The solution of the problem is based on the idea of using a rotary battery switch not in combination with an ordinary commutator as hitherto proposed but in combination with commutating segments which are substantially wider than the segments of the battery switch, the said commutating segments and battery switch segments being provided along separate circumferences or along one and the same circumference of the apparatus hereinafter referred to and claimed as a commutator having some of the contacts substantially wider than the other contacts.

Figure 6:
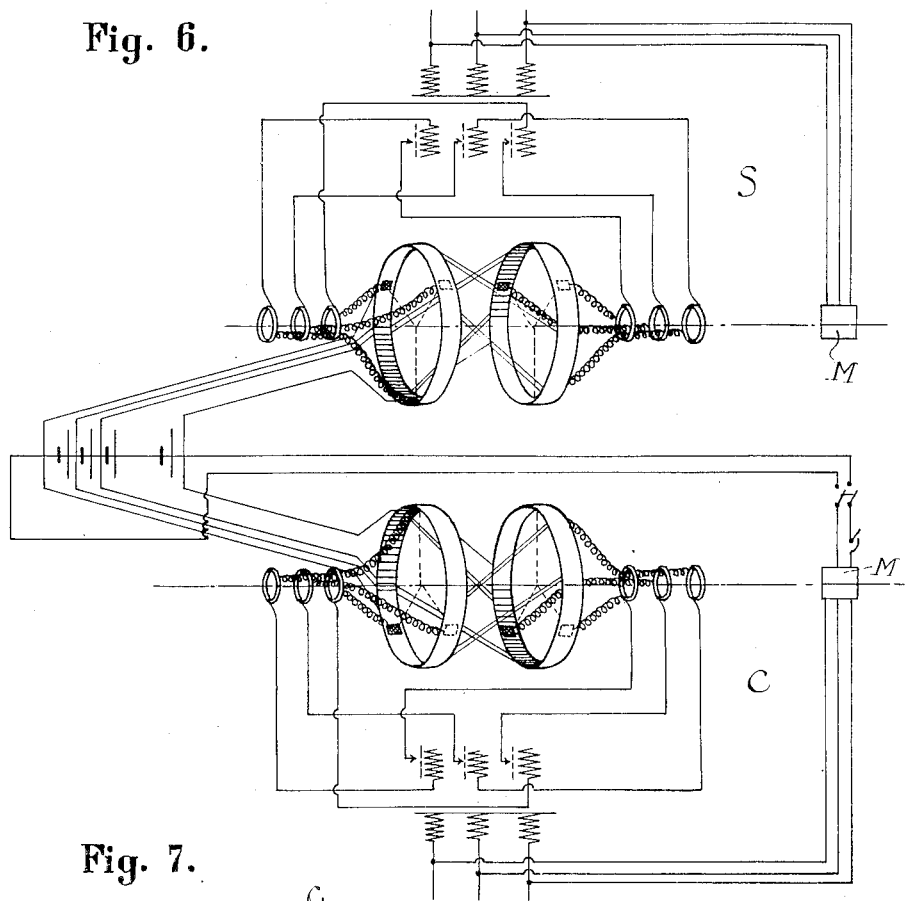
Figure 7:
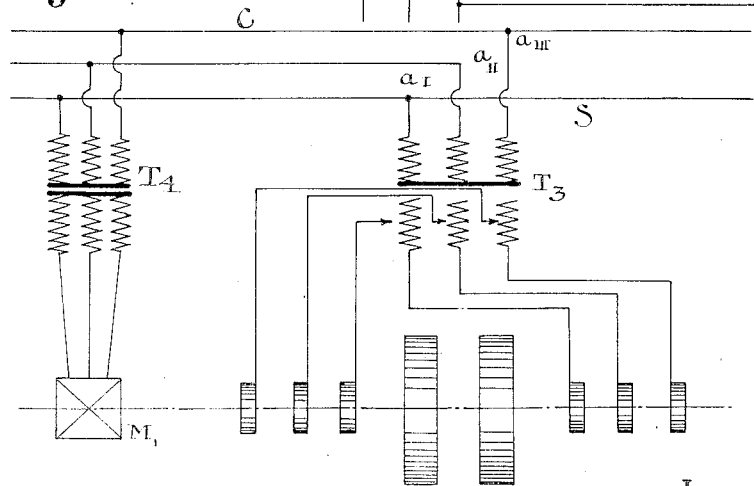
Figure 10:
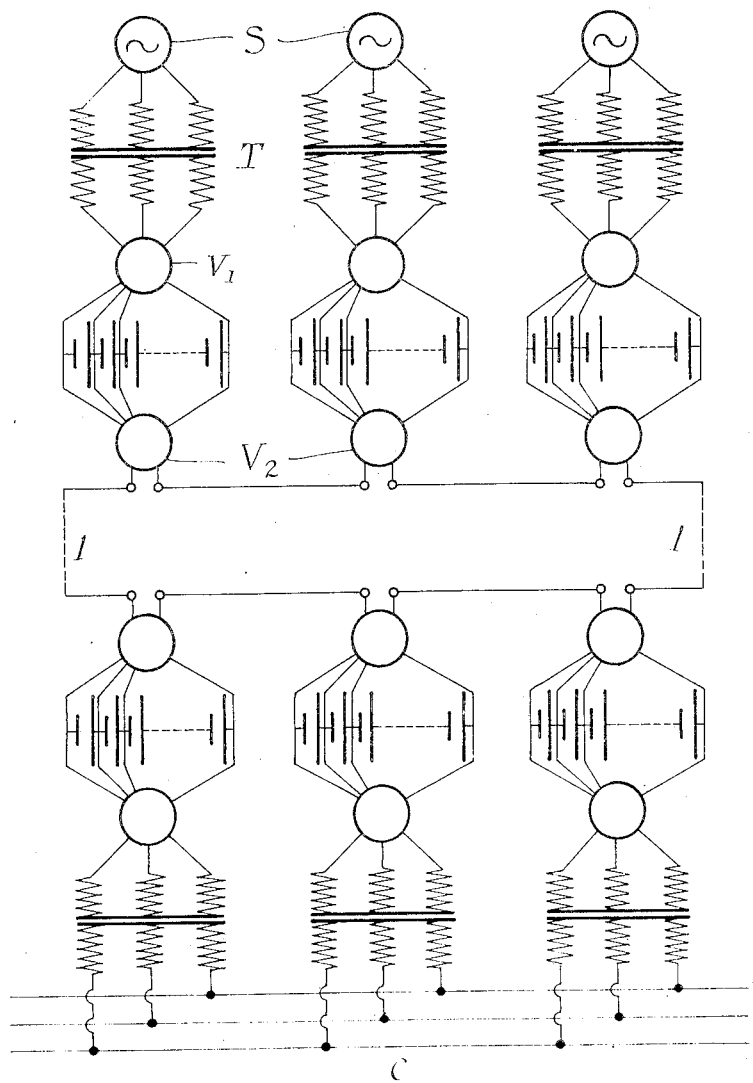

In the accompanying drawings Figure 1 illustrates an arrangement in which the wider segments are mounted on a separate member from that on which the narrower segments are provided. Figure 2 is a modification in which all the segments are mounted on one and the same member. Figure 3 is a further modification by which a current of sinusoidal form is obtained. Figure 4 is a diagram of the form of curve obtained with three stators. Figure 5 is a further modification for use in connection with multi-phase current. Figure 6 illustrates a duplicate arrangement for use in connection with a three phase supply circuit and a single battery of accumulators. Figure 7 is an arrangement in which the number of phases is different on the consuming side as compared with the number of phases on the supply side. Figure 8 is a modification to be used in connection with motors having a bad power factor and when an irregular load is to be dealt with. Figure 9 shows the application of the invention to the transmission of power by means of high voltage continuous currents whilst Figure 10 illustrates another application of the invention in which the periodicity of the current is changed in a transmission system.

Referring to Figure 1, 1, 2, 3 are the elements of the battery, $a$ are the contacts of the battery switch, $c$ is a rotary contact arm, $d$ is a commutator, $e$ is a contact arm co-operating therewith and $f$ are the terminals from which an alternating current is supplied. By the expression "element" above referred to, I mean a complete group of cells connected in series with one another. These groups, which may be of any desired number, are connected to the segments of the commutator over which slide the rotary contacts or brushes, the latter being driven by an auxiliary motor (not shown in the drawing).

The diagram of connections is reversible. When a consuming apparatus or a generator supplying a lower E. M. F. than the voltage supplied by the battery is connected to the terminals of the alternating current, the battery of accumulators will discharge and deliver alternating current to the circuit, the frequency of such current depending on the speed of the auxiliary motor. If, however, the terminals are connected to a generator of alternating current, the E. M. F. of which is greater than that of the battery, and if in addition thereto, the auxiliary motor runs synchronously with the generator, the current will charge the battery. In both cases the current flows through the cells continuously in one and the same direction (whether it is a discharging or a charging current), in spite of the fact that its direction alternates periodically in the outer circuit.

Figure 2 illustrates a modification of the arrangement illustrated in Figure 1. The two brushes or rotor contacts $c$, $e$ are diametrically opposite each other, and the commutator and battery switch are combined together into a stator A and two slip rings $B_1$, $B_2$. $a$ are the contacts of the battery switch, $a_1, a_1$ being the contacts connected to the two ends of the complete battery and being of substantially greater width than the other contacts, whilst $a_2$ is a dead contact. Such an arrangement may be carried out in practice in two different ways, viz:—

(1) The slip rings are fixed and constitute a part of the stator, and a pair of brushes $b_1$, $b_2$ are caused to slide thereon, which brushes are electrically connected with the brushes $c_1, c_2$ sliding on the segments, or (2) The slip rings rotate together with the contact arms, and are also electrically connected with the segment brushes, and the supply of current from the slip rings is effected by means of fixed brushes which are connected to the terminals of the apparatus.

By providing several pairs of brush holders and displacing them relatively to one another through a certain angle, and by associating each pair of these brush holders with a corresponding pair of contact rings and commutator brushes, the diagram of connections according to Figure 2 can be used for multiphase currents.

The arrangements shown in two diagrams above referred to have two great disadvantages, viz, none of them gives a sine curve and none of them can be used in those cases where there is a phase displacement between the current and the voltage. The sine curve may be obtained by making the successive segments of suitable different widths; however the second disadvantage can only be removed by making use of a more complicated construction and of two stators with one rotating member or vice versa. The construction first referred to illustrated in Figure 3, wherein the developed surfaces of the stators which are intended to be used with a battery subdivided into twenty groups, show divisions corresponding to a sinus curve. It is to be understood that in this figure the slip rings $B_1$, $B_2$ and brushes $c_1, c_2$ constitute together one single rotating member. The part of the arrangement which is illustrated between the battery and the stators is explained more fully further below.

In order to be able to use the mechanism just referred to for the working with wattless currents, the groups of the battery are connected to the stators $A_1$ and $A_2$ in such a manner that the succession of the groups to be switched on is reversed at predetermined intervals, otherwise the charging of the battery would be effected by the wattless currents.

Such an arrangement of connections cannot be carried out in practice solely by means of one commutator and of one rotating member, and if two rotating members were employed which were caused to rotate in opposite directions by means of a differential gear, the arrangement would be too complicated. For this reason the arrangement illustrated in Figure 3, in which two stators and one rotating member are employed, has to be resorted to. In this arrangement each contact $a_1$ which is substantially wider is used in combination with a series of narrower contacts $a$ of increasing widths, the increase in width in one commutator taking place in a clockwise direction of rotation and in the other commutator in an anti-clockwise direction. For the purpose of collecting or supplying the current, two brushes are required per phase. When the two stators are mounted relatively to one another in the manner indicated in Figure 3, one of the two brushes lying on the same cylinder line, slides over the contacts $a$, whereby its potential is varied from zero to a maximum, whilst the other brush on the contrary, slides on the wider contact $a_1$ thereby retaining a constant potential. Thereupon the position is altered in so far as the first brush receives a constant potential whilst the other one slides over the divided contacts $a$. In this way the one brush produces continuously the ascending part of the voltage curve and the other one the descending part thereof.

The stators may be arranged relatively to one another in a different position as compared with their relative position in Figure 3.

The brushes $c_1$, $c_2$ are electrically connected to the slip rings $B_1$, $B_2$, which are likewise mounted on the rotor shaft (not shown), and in their turn supply the current to, or receive it from, the fixed brushes $b_1$, $b_2$ which are connected to the terminals of the machine. The divisions of the commutator corresponding to a sinus curve are shown in Figure 3. However, these divisions may be made to correspond to any other geometrical form of curve.

When a source of current having an unsymmetrical voltage curve is used for charging, such asymmetry does not prevent the divisions of the segments from being effected so as to correspond to the asymmetry, in order that the cells should work properly, it being of course understood that the rule above given for connecting the groups must be adhered to.

In order to produce three-phase and generally any poly-phase currents, the rotor has to be provided with several pairs of brushes disposed at suitable angles, and with two slip rings for each phase. In the case of three-phase currents, six rings have to be used which, however, cannot be connected in pairs to form three units, as such an arrangement would cause substantial parts of the battery to be continuously short-circuited. However, there is no objection to the three phases being connected to the three separate primary windings of a transformer, the secondary windings of which are connected in the usual way, with one another and to the three terminals and sometimes to the neutral point.

It is to be pointed out that as regards the battery of accumulators that works as a generator or as a consuming apparatus of poly-phase current, it is quite immaterial whether the individual phases are loaded equally or unequally.

As a modification the battery switch converter may be constructed for use with a plurality of circuits, in the same way as in the case of multi-polar parallel armature windings, distributing the contacts $a$, $a_1$ shown in Figure 3 over an angle of 360° and repeating it $n$ times over the 360°, the corresponding contacts in the $n$ sections being electrically connected together. Such a parallel connection may be used in battery switch converters in the case of large currents.

When the brushes pass from one contact to the other, each group of cells is short-circuited in succession. During the commutation it is necessary to insert a series resistance, in order to prevent an inadmissible increase of current taking place and in order to bridge over to a certain extent the steps of the voltage. These resistances may be inserted, either in each division of connections of the groups of cells, or in each second division as shown for instance at $g$ (Fig. 3).

When the battery of accumulators is charged from an alternating current generator by means of a battery switch converter and supplies continuous current, or vice versa, when it supplies alternating current through the battery switch converter and is charged with continuous current, the arrangements hereinbefore described do not ensure that the work shall be equally distributed amongst all the groups of batteries; the outer groups work less intensively than the middle ones; whilst they are being charged, they receive less ampere-hours, and whilst they are discharging they supply less ampere-hours. The difference is about 20%. When the strength of the continuous current is adjusted in such a manner that the outer cells are maintained in the fully charged condition, the middle ones are overcharged and the losses thereby caused amount to about 20%. Where this is inadmissible, the following steps may be taken:—

1. A group change-over switch may be added to the circuit in the manner diagrammatically indicated at $h$ in Fig. 3, which switch changes over the groups after they have been in operation for a few hours, in such a manner that the middle groups assume an outer position, whereby the order of succession of the numbers of the groups is changed. This change-over switch reduces the losses to about 5%.

2. Use may also be made in addition to the two stators shown in Figure 3, of an additional stator provided with commutator segments, as shown developed in Fig. 4, in which the three stators are indicated by I, II, III. The rotating member of this additional stator is not in any way different from that of the main stators and is mounted on the same shaft together with the latter and the electrical connections for one such particular case are illustrated in Figure 5, which is more fully described below. Whilst one of the brushes slides over the contacts 1–19 of the stator I, its potential is varied from zero to a maximum as indicated by the curve C I, being then maintained constant as the brush slides along the contact 20. During this time the brush of the stator II slides over the wider contact O, its potential being thus constant and starting to increase as indicated by the curve C II when it reaches the contact 1 of the series of contacts 1–19 of its stator. The variation of the potential of the brush co-operating with the additional stator III is indicated by the curve C III. If we compare the horizontal lines $x\ y\ z$ as limited by the points $x_1$, $x_2$, $y_1$, $y_2$, and $z_1$, $z_2$ respectively, we see that the middle elements of the battery are used during both charging and discharging for a larger period than the extreme elements of the battery. Now the object of the third or additional stator is to render the distribution of the charge and discharge more uniform throughout the whole of the battery by compensating for the longer operation of the middle elements. This is effected by arranging that the brushes of the third stator which give a potential difference always acting in opposition to the brushes of the other two stators, shall be connected to the middle elements for a longer period as compared with the period during which they are connected to the end elements, as indicated by the lines $w$. The operation of the auxiliary stator is as follows:—When the main battery switch converter discharges the battery, it does not charge the individual groups of the auxiliary stator to the same extent viz:—It charges to a larger extent those groups which discharge to a larger extent. When the main battery switch converter charges the battery it discharges those groups of the auxiliary stator to a larger extent, which are charged to a larger extent. In this way it is always possible to return the superfluous quantity of electricity to the circuit and completely remove the lack of uniformity between the individual groups. Moreover, in the case of a six-phase arrangement, the additional stator permits the battery of being reduced to such an extent that the current it gives is approximately half the current in the case of a three-phase arrangement. It is also to be pointed out that the object of the present invention is attained by means of an additional stator in a more perfect way than by the use of a group reversing switch as described in Fig. 3; moreover, when an additional stator is used, it is not necessary to stop the converter during the operation of the change-over mechanism.

In those cases in which the battery switch converter converts alternating current of one frequency into another one of a different frequency by means of accumulators, and in all those cases in which the battery is charged and discharged through the battery switch converter, the lack of uniformity in the charge of the individual groups above referred to does not exist and in these cases the group of switches and the additional stator are dispensed with. When the accumulators are used in conjunction with battery switch converters not only for the purpose of splitting the voltage but also for the purpose of allowing their full capacity to be supplied, the variation in the E. M. F. relatively to their condition of charge must be taken into account. In such a case the utilization of battery switches would be of no use.

The output of the auxiliary motor that drives the rotor must be sufficient to remove the friction resistance, its load remaining the same for all the loads of the battery switch converter. In order that the operation of the auxiliary motor should be as stable as possible, the motor should be sufficiently large and normally it shall not be fully loaded. The actual construction of the motor is immaterial; however, if the battery switch converter works in parallel with an external source of current it must maintain the correct synchronism and in the case of a separate battery, its speed must be constant.

The battery switch converter may be constructed in many different ways according to the object in view.

The battery switch converter may be operated with accumulators and primary cells of different types and systems. For many of the possible applications it is, however, advisable to use alkaline accumulators, which can stand a heavy overload and require less attention.

The arrangement hereinbefore described may be used in many different ways, and the following possible applications are only given by way of example:—

1. As a portable electro-chemical generator of alternating current.

2. For charging accumulators from an alternating current supply circuit.

3. For converting continuous current into alternating current and vice versa.

4. For converting alternating current of one kind into alternating current of another kind, such as by changing the frequency.

5. For feeding induction motors when a wide range of speed regulation (for instance in the case of railway motors) and a very economical production of work, when the loads change suddenly and frequently, are required.

6. For making the power factor as nearly as possible equal to unity.

7. For the transmission of power by means of high tension continuous current.

8. For the transmission of power by means of alternating current of any low periodicity whilst using generators, transformers and consuming apparatus of normal periodicity.

9. For the production of such forms of voltage curves which cannot be obtained by the usual generators.

The use of the battery switch converter in conjunction with a portable battery of accumulators makes it possible (for instance in the case of electric locomotives, for mixed service of overhead lines and accumulators or in the case of purely accumulator service)

to charge the cells at any desired place from an alternating current supply, provided the transformer that is inserted into the circuit corresponds to the voltage of the alternating current.

Such an arrangement is also suitable in special cases when alternating current is to be derived from a portable battery of accumulators.

The battery switch converter greatly extends the scope of the possible applications of portable accumulators, and it also opens a new field in connection with weak currents such as used in telegraphy, in so far as it permits of obtaining from a battery, currents, the curve of which is of any desired predetermined shape.

Various applications of the invention are illustrated by way of example, in Figures 5 to 10.

Figure 5 illustrates a diagram of connections of a battery switch converter with three commutators I, II, III for three-phase currents, III being an auxiliary commutator and working in the manner above described with reference to Figure 4. In this arrangement the secondary of the transformer $T_1$ connecting the stators I, II, III to the alternating current side has each of its secondary windings divided into two parts of which the parts $III_1$, $III_2$, $III_3$ are connected to the stator III whilst the other parts $t_1$ are connected to the stators I, II. The stator III is connected to the secondary parts $III_1$, $III_2$, $III_3$ through three slip rings and associated movable and stationary brushes in a known manner. A three-phase rotary transformer $T_2$ is inserted in the outer circuit for the purpose of regulating the voltage.

Figure 6 illustrates a duplicated arrangement of battery switch converter and commutator as described more particularly with reference to Figure 3 showing the arrangement illustrated in that figure connected up to a three-phase supply circuit and to a common battery of accumulators. It is however to be borne in mind that when the battery is charged and discharged by an alternating current, a group change-over switch is not required. In this arrangement M is an auxiliary motor by means of which the rotating parts of the battery switch converter are rotated, the circuit of the motor also including the usual switches and a variable resistance. The transformers shown are constructed as tapped transformers so as to be able to vary the ratio of transformation. In this arrangement S is the supplying-side and C the consuming side. With this arrangement it is possible to charge the batteries from a supply circuit in which the frequency is different from the circuit supplying the current to the consuming apparatus.

Figure 7 illustrates an arrangement in which the number of phases is changed in the consuming side C of the apparatus as compared with the number of phases on the supply-side S thereof, this being an arrangement to be used for instance when the supply side delivers one single-phase current and the consuming side contains apparatus for three-phase currents or vice versa. In this arrangement $T_3$ is a three-phase transformer interposed between the battery switch converter and the alternating current lines, the transformer being provided with tappings for the purpose of voltage regulation. $M_1$ is an auxiliary motor for driving the rotatable members of the battery switch converter and $T_4$ is a three-phase transformer interposed between the alternating current lines and the said auxiliary motor. In this arrangement the battery may be charged from the single phase side and at the same time be discharged to the three-phase side or vice versa, both charging and discharging currents passing through the same transformer $T_3$. The potential difference between the points $a_I$ and $a_{II}$, $a_{II}$ and $a_{III}$ and $a_I$ and $a_{III}$ will always have an equal alternating value corresponding to the voltage of the battery, which works in this case as a booster battery. In this way the battery equalizes through the transformer $T_3$ the currents in all the three phases of the three-phase side.

Figure 8 illustrates an application of the invention to be used when motors have a bad power factor and when an irregular load has to be dealt with. In this arrangement C is the consuming side and S is the supplying side. The battery of accumulators which is connected to the outer circuit by means of a suitable transformer $T_3$ lies at the branching-off point from the main line to the individual consuming point or group of consuming points where motors having a bad power factor and an irregular load are provided. VR is a dynamo acting as a voltage regulator. $M_1$ is an auxiliary motor for driving the rotatable members of the battery switch converter and $T_4$ is a three-phase transformer interposed between the alternating current side and the said auxiliary motor. The battery is charged or discharged from the main line by means of battery switch converters. The battery switch converter may be so set that only the watt component of the current circulates along the whole line from the generator to the battery. The part played by the battery switch converter in this case is similar to the part played by the rotary converter, being used at the same time for the compensation of the wattless currents. However, in the diagram of connections referred to, the battery also replaces a booster battery thereby causing the generator to give the best output at the highest efficiency and without any sudden load-variations, irrespective of the fluctuations of the load at the consuming point. Moreover, the battery may be of such size as to allow the consuming apparatus to be wholly or partly disconnected from the central station during the period of maximum load. The ideal working of a central station would be if the generators were exclusively used for charging batteries of accumulators mounted at the various consuming points or groups of such points. In that case, cells of comparatively small capacity could be used.

Figure 9 illustrates the application of the invention to the transmission of power by means of high voltage continuous currents. In this arrangement the distant line connects together two groups of batteries in opposition to one another, one of which groups is mounted at the generator station and the other one at the consuming point. The construction of the cells of these batteries, the capacity of which is very small, is similar to that of the electro-chemical safety devices for excessive voltages. Each battery consists of a number of groups 2 connected in series with one another, each one of which is provided with a high voltage battery switch converter 3 mounted on a vertical shaft. These battery switch converters are connected to the high voltage windings 4 of transformers, the low voltage windings 5 of which are connected to the supply circuit 6; in the sub-station they are connected to the bus-bars feeding the consuming points. The battery switch converters provided at the generating station charge the battery with high voltage alternating current and the battery switch converters at the receiving station receive the same from the battery. The battery at the central station which is charged from a source of alternating current feeds the distant line 1 with continuous current which charges the battery at the receiving station, the latter in its turn giving alternating current at the consuming point.

By using such a scheme, it is possible to secure all the advantages of the transmission of power by means of high voltage continuous currents; at the same time it is to be pointed out that the system according to the present invention is not so inelastic as the system Thury.

In the application just referred to, the battery switch converters must be constructed in such a way that the lack of uniformity in the charge of the cells is entirely removed; this is attained by providing each converter with an additional commutator.

Figure 10 illustrates another application of the invention in which alternating currents of a certain periodicity are converted into currents of a lower periodicity which are transmitted over a distant line. Use is made of the frequency changers above referred to, namely of those intended for high voltage batteries, a plurality of which frequency changers are connected in series at the central station and at the consuming point by means of battery switch converters of low frequency. It will thus be seen that the present invention permits in this case all the generators, transformers and consuming apparatus to be constructed for a normal periodicity. Referring to Figure 11 of the drawing S are the alternating current generators which are connected to respective commutators $V_1$, such as hereinbefore described through the intermediary of transformers T, the commutating devices being used for charging corresponding batteries which in their turn are further connected to a series of commutators $V_2$ connected to the line 1. By this arrangement the periodicity of the alternators S is reduced to a smaller periodicity, the currents being transmitted over the line 1 to the consuming circuit C through an arrangement similar to that just described.

When the battery of accumulators is fed by a source of continuous current whilst at the same time an alternating current discharge takes place through the battery switch converter or vice versa, the whole of the system (the battery of accumulators made up of cells of practically no capacity and the battery switch converter) constitutes a continuous current-alternating current-converter.

Owing to its very high efficiency, the system can compete not only with the motor generator but also with the rotary converter. The essential difference lies in the fact that the conversion of the one kind into another kind of electric energy is not produced by electromagnetic but by electro-chemical means.

The system hereinbefore described has certain great advantages viz: it can cope with any temporary overload, the battery has a boosting effect and the work performed is entirely independent of any lack of uniformity of the load on the different phases. A further very great advantage is the possibility of producing at will from one and the same battery switch converter single or multi-phase current, which current can be produced at an alternating voltage which is independent of the number of phases The voltage of the direct current depends on the voltage on the adjustable transformer winding being equal to the amplitude of the alternating voltage if the losses are not taken into consideration, but if the losses are taken into account, it is slightly higher or lower than the alternating voltage according as to which of the two currents is the charging current.

The strength of the continuous current is equal to half the amplitude of the alternating current multiplied by the number of phases, if the losses are not taken into account.

The superposition of alternating and continuous current in the individual accumulators reduces the ohmic losses, as is also the case with rotary converters.

A battery especially constructed for the conversion of currents and having no other duties to perform, can be made simple and cheap. The capacity it must have is dependent only on the means employed for compensating the lack of uniformity.

It is convenient to use a battery of accumulators and a battery switch converter in order to convert alternating current of one kind into alternating current of another kind. In this case there are no losses due to lack of uniformity in the working of the individual groups and the cells may be so constructed as to have a very small capacity.

As a rule, what is required for such conversion is a battery and two battery switch converters as described with reference to Figure 6; however in special cases, it is possible to use arrangements which are more simple. For instance, when the two currents differ from each other only by the number of phases, it is sufficient to use one single battery switch converter as described with reference to Figure 7.

What I claim is:—

1. For the conversion of direct current into alternating current or vice versa, the combination of a battery of accumulators with two commutators each commutator having a series of contacts connected to individual "elements" of the battery so that their succession is periodically reversed, some of the contacts of each commutator being substantially wider than the other contacts, the latter contacts increasing in width in one commutator in a clockwise direction and in the other commutator in an anti-clockwise direction, brushes capable of rotating along the inner surface of the two commutators in such a manner that whilst one brush moves along the said wider contacts, the other brush moves along the smaller contacts, so that the first brush is at a constant potential and the other one at a variable potential, slip rings for each phase of alternating current, and fixed brushes for deriving the current from the slip rings or supplying it thereto, as set forth.

2. In combination with a source of E. M. F. a commutator for converting direct current into alternating current and vice versa having a plurality of segments connected to the source of E. M. F. some of which segments are substantially wider than the others and a pair of brushes capable of sliding on the said segments, in such a manner that whilst one brush moves along the said wider segments the other brush moves along the smaller segments, so that the first brush is at a constant potential and the other one at a variable potential, as set forth.

3. A battery switch converter for converting continuous current into alternating current and vice versa, for the purpose of ensuring a uniform utilization of the individual groups of batteries with which the battery switch converter is intended to be used, having a stator comprising three commutators, two of which are constructed as claimed in claim 1, while the third one has segments which are subdivided in such a way as alternately to increase and decrease in width in combination with rotors for the three commutators, a common shaft for all the rotors and connections for the individual parts of the three commutators such as to cause the latter to work in opposition to the first two commutators and return to the circuit the superfluous energy received from the individual groups of batteries.

In testimony whereof I have signed my name to this specification.

SERGEI ANDREJEWITSCH KUKEL.